United States Patent
Tossavainen et al.

(10) Patent No.: US 10,264,116 B2
(45) Date of Patent: Apr. 16, 2019

(54) VIRTUAL DUPLEX OPERATION

(71) Applicant: Nokia Technologies Oy, Espoo (FI)

(72) Inventors: Antero Tossavainen, Tampere (FI);
Miikka Tapani Vilermo, Siuro (FI);
Matti Kustaa Kajala, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/341,072

(22) Filed: Nov. 2, 2016

(65) Prior Publication Data
US 2018/0122395 A1    May 3, 2018

(51) Int. Cl.
*H04M 3/00*    (2006.01)

(52) U.S. Cl.
CPC ................. *H04M 3/002* (2013.01)

(58) Field of Classification Search
CPC .... G10L 19/167; G10L 19/0204; G10L 19/26
USPC ........................................................ 704/500
See application file for complete search history.

(56) References Cited

U.S. PATENT DOCUMENTS

| | | | | |
|---|---|---|---|---|
| 7,180,892 B1* | 2/2007 | Tackin | .................... | G10L 25/90 370/389 |
| 8,494,178 B1* | 7/2013 | Carpenter | ................ | H04R 3/02 361/1 |
| 8,942,370 B2 | 1/2015 | Li et al. | .................... | 379/406.05 |
| 2003/0050786 A1* | 3/2003 | Jax | ........................ | G10L 21/038 704/500 |
| 2005/0004794 A1* | 1/2005 | Son | ........................ | G10L 19/24 704/219 |
| 2005/0027516 A1* | 2/2005 | Lee | ........................ | G10L 21/038 704/219 |
| 2005/0058230 A1* | 3/2005 | Thomas | ................... | H04B 1/10 375/347 |
| 2005/0207585 A1* | 9/2005 | Christoph | ............ | G10K 11/178 381/71.11 |
| 2006/0277038 A1* | 12/2006 | Vos | ..................... | G10L 19/0208 704/219 |
| 2007/0110042 A1* | 5/2007 | Li | .......................... | G10L 25/78 370/352 |
| 2008/0027711 A1* | 1/2008 | Rajendran | ............ | G10L 19/167 704/201 |

(Continued)

FOREIGN PATENT DOCUMENTS

| CN | 101562669 A | 10/2009 |
|---|---|---|
| EP | 2741481 A2 | 6/2014 |

(Continued)

OTHER PUBLICATIONS

Buchner, H. et al.; "Wave-domain adaptive filtering: acoustic echo cancellation for full-duplex systems based on wave-field synthesis"; May 17-21, 2004; IEEE International Conference on Acoustics, Speech, and Signal Processing, 2004 (ICASSP'04); whole document (8 pages).

*Primary Examiner* — Jakieda R Jackson
(74) *Attorney, Agent, or Firm* — Harrington & Smith

(57) ABSTRACT

A method including, while first audio signals from a first user are being transmitted on a first bandwidth from a first apparatus, detecting transmitting of second audio signals from a second user by a second apparatus; and based upon the detecting of the second audio signals from the second apparatus, reducing the transmitting of the first audio signals on the first bandwidth to transmitting of the first audio signals on at least one first relatively smaller sub-band of the first bandwidth.

30 Claims, 9 Drawing Sheets

(56) References Cited

U.S. PATENT DOCUMENTS

| | | | | |
|---|---|---|---|---|
| 2009/0024399 A1* | 1/2009 | Gartner | ............... | G10L 19/0208 |
| | | | | 704/500 |
| 2010/0063827 A1* | 3/2010 | Gao | ..................... | G10L 21/038 |
| | | | | 704/500 |
| 2010/0191525 A1* | 7/2010 | Rabenko | .................. | H04B 3/23 |
| | | | | 704/211 |
| 2010/0297271 A1* | 11/2010 | Mehal | .................. | A61K 9/0019 |
| | | | | 424/730 |
| 2011/0235500 A1* | 9/2011 | Shenoi | .................. | H04J 3/0632 |
| | | | | 370/201 |
| 2011/0295598 A1* | 12/2011 | Yang | ..................... | G10L 21/038 |
| | | | | 704/205 |
| 2014/0328490 A1* | 11/2014 | Mohammad | ............ | H04R 3/002 |
| | | | | 381/66 |
| 2015/0011266 A1* | 1/2015 | Feldt | ..................... | H04M 9/082 |
| | | | | 455/570 |
| 2015/0188588 A1* | 7/2015 | Groh | .................. | H03H 17/0267 |
| | | | | 375/340 |
| 2015/0350778 A1* | 12/2015 | Ramprashad | ......... | H04M 19/08 |
| | | | | 381/66 |
| 2016/0322982 A1* | 11/2016 | Pagnanelli | ........... | H03M 1/0626 |
| 2017/0004846 A1* | 1/2017 | Rasmussen | .......... | G10L 21/0324 |

FOREIGN PATENT DOCUMENTS

| | | |
|---|---|---|
| EP | 2828851 A1 | 1/2015 |
| WO | WO-2013/142647 A1 | 9/2013 |
| WO | WO-2013/166080 A1 | 11/2013 |
| WO | WO-2015/080927 A1 | 6/2015 |

\* cited by examiner

VIRTUAL DUPLEX OPERATION

BACKGROUND

Technical Field

The exemplary and non-limiting embodiments relate generally to audio signal transmission and, more particularly, to varying use of bands for audio signal transmission.

Brief Description of Prior Developments

Full duplex communication is known where two people can talk and be heard at a same time on two different devices, such as with a mobile telephone for example. Push-To-Talk (PTT) and Voice Operated X-mitter (VOX) technology is also known in half-duplex operation.

SUMMARY

The following summary is merely intended to be exemplary. The summary is not intended to limit the scope of the claims.

In accordance with one aspect, a method comprises, while first audio signals from a first user are being transmitted on a first bandwidth from a first apparatus, detecting transmitting of second audio signals from a second user by a second apparatus; and based upon the detecting of the second audio signals from the second apparatus, reducing the transmitting of the first audio signals on the first bandwidth to transmitting of the first audio signals on at least one first relatively smaller sub-band of the first bandwidth.

In accordance with another aspect, an apparatus is provided comprising at least one processor; and at least one non-transitory memory including computer program code, the at least one memory and the computer program code configured to, with the at least one processor, cause the apparatus to: while first audio signals from a first user are being transmitted on a first bandwidth from the apparatus, detect transmitting of second audio signals from a second user by a second apparatus; and based upon the detecting of the second audio signals from the second apparatus, reduce the transmitting of the first audio signals on the first bandwidth to transmitting of the first audio signals on at least one first smaller sub-band of the first bandwidth.

In accordance with another aspect, a non-transitory program storage device is provided, readable by a machine, tangibly embodying a program of instructions executable by the machine for performing operations, the operations comprising: while first audio signals from a first user are being transmitted on a first bandwidth from a first apparatus, detecting transmitting of second audio signals from a second user by a second apparatus; and based upon the detecting of the second audio signals from the second apparatus, reducing the transmitting of the first audio signals on the first bandwidth to transmitting of the first audio signals on at least one smaller sub-band of the first bandwidth.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
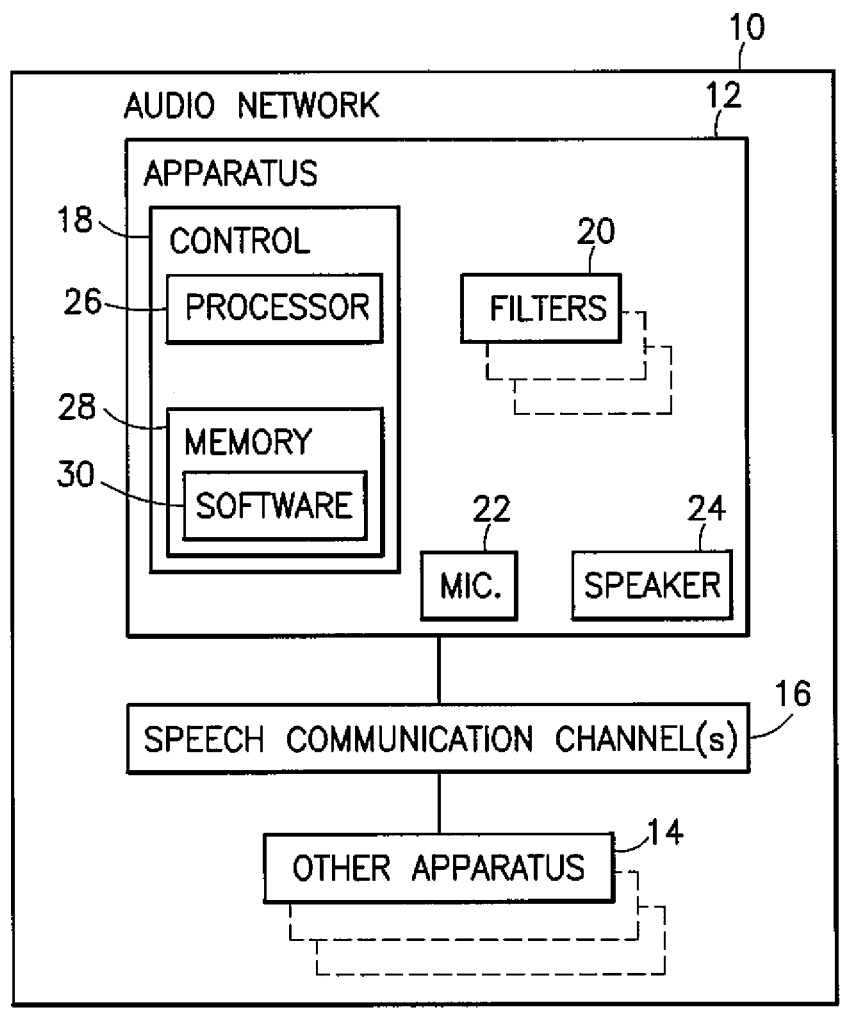
FIG. 1 is a diagram illustrating some features of an example embodiment.

Referring to FIG. 1, there is shown a diagram illustrating an audio network 10 incorporating features of an example embodiment. Although the features will be described with reference to the example embodiments shown in the drawings, it should be understood that features can be embodied in many alternate forms of embodiments.

The audio network 10 generally comprises an apparatus 12 operably connected to at least one other apparatus 14 by at least one speech channel 16. The apparatus 12 generally comprises a control 18, filters 20, one or more microphones 22 and one or more speakers 24. The control 18 comprises at least one processor 26, and at least one memory 28 having software or computer code 30.

Figure 2:
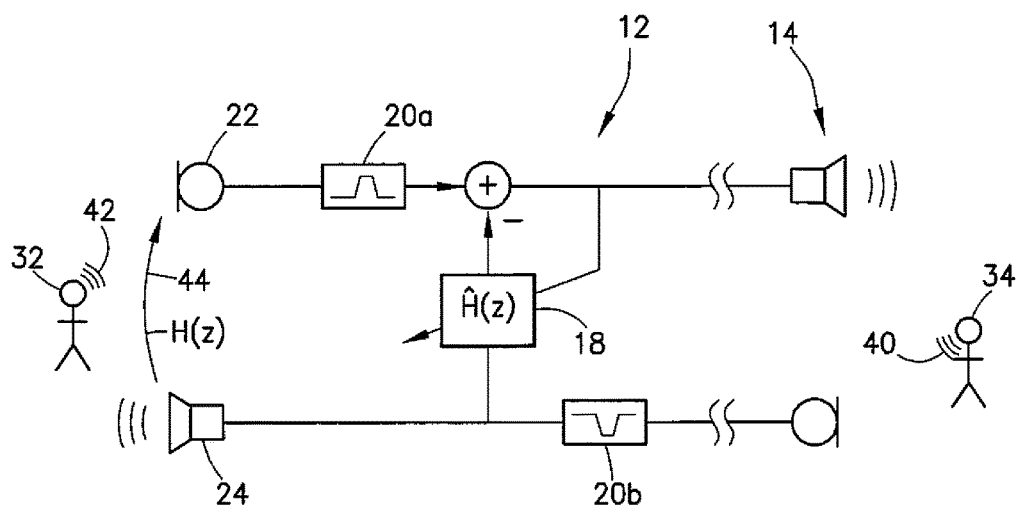
FIG. 2 is a diagram illustrating some features of the example shown in FIG. 1.

Referring also to FIG. 2, the apparatus 12 may be used to allow a first user 32 using the apparatus 12 to communicate with a second user 34 using the other apparatus 14. In this example embodiment the first user 32 may be a person at a stage area or recording location of a virtual reality (VR) recoding. The second user 34 may be a producer of the virtual reality (VR) recoding for example. Because the virtual reality (VR) recoding may have a 360 degree recording field of view, the producer 34 is preferably located away from the stage area; so the producer will not be seen in the recording. However, the two users 32, 34 still need to communicate with one another during the process of making the virtual reality (VR) recoding.

Features as described herein may provide reaching virtually duplex operation of a speech link, even in extremely adverse conditions (such as when the users 32, 34 at both ends talk simultaneously for example), while maintaining natural speech sound color (full vocal frequency range) for the rest of cases where there is less speech activity in the other end.

Figure 3:
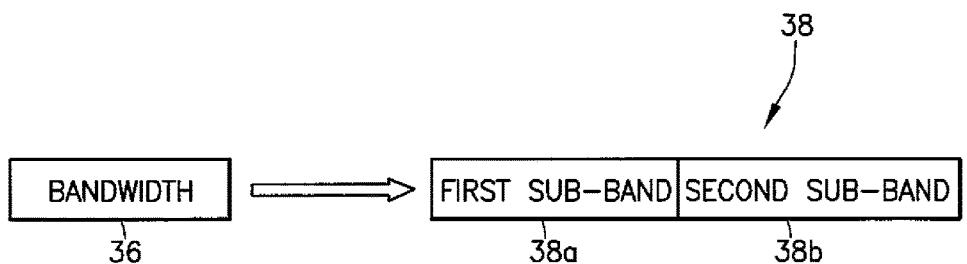
FIG. 3 is a diagram illustrating splitting of a bandwidth into multiple sub-bands.
Figure 4:
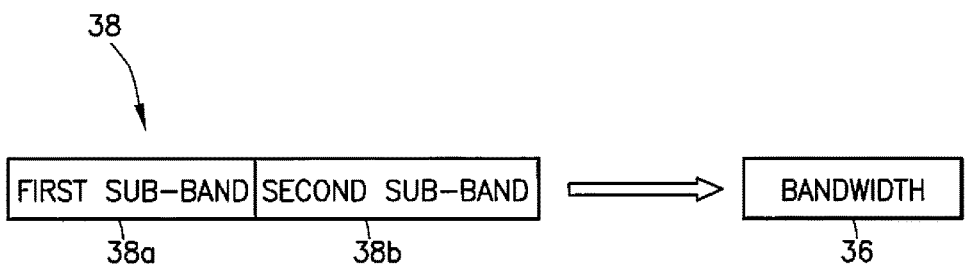
FIG. 4 is a diagram illustrating de-splitting of multiple sub-bands back into a bandwidth.

Features as described herein may be used to split a speech bandwidth into two or more sub-bands, and use a control method that selects which sub-band is used for speech transmission, and at which time and in which direction. This is illustrated in a very generalized way in FIG. 3. Normally, a bandwidth 36 may be provided in a communication channel from the producer 34 to the actor 32. However, when a double-talk situation occurs, the apparatus 12 may split the use of the frequency bandwidth 36 into two or more sub-bands 38. In the example shown, the bandwidth 36 is split into a first sub-band 38a and a second sub-band 38b. The first sub-band 38a may be used for transmitting the sound 40 from the producer 34 and the second sub-band 38b may be used to transmit the sound 42 from the actor 32. This is merely an example and should not be considered as limiting. When the double-talk situation ends, the apparatus may switch back to the single bandwidth as shown in FIG. 4. In one type of example the control 18 may be configured to use feedback 44 (see FIG. 2) to control when the switching or changing is made such as in FIG. 3 or 4 for example.

Wideband telephony speech typically contains frequencies on a range from 100 Hz up to 6800 Hz. Sub-band division (detailed frequency bounds) can be adjusted either by an adaptive control logic, or, sub-band division can be fixed with a pre-set values specific to a certain device. For example, in FIG. 2, a band-pass filter 20a and a band-stop filter 20b, provided as a pair, could have corner frequencies of about 1000 Hz and 3000 Hz. On the other hand, in the case of a pair of high-pass and low-pass filters, corner frequency could be something such as 2000 Hz for example.

Figure 5:
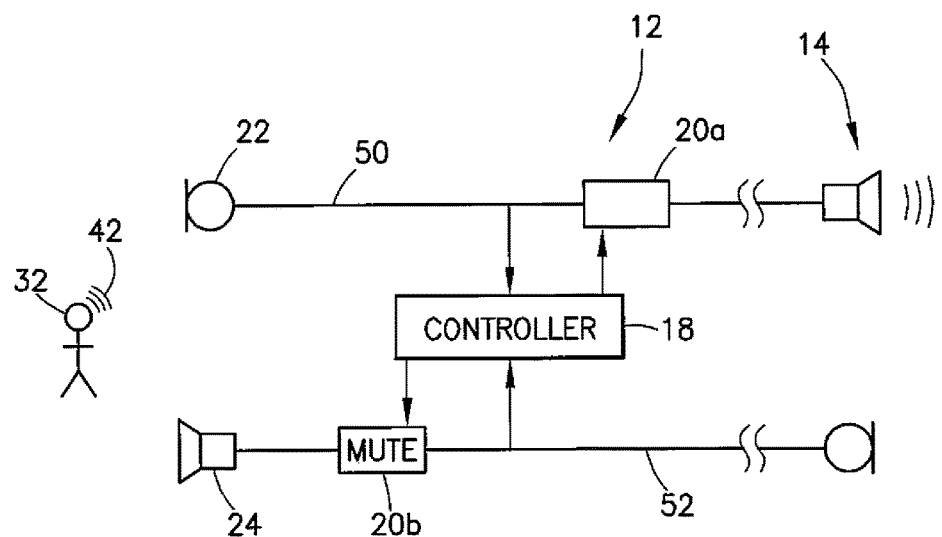
FIGS. 5-8 are diagrams illustrating different use situations of the apparatus shown in FIG. 2.
Figure 6:
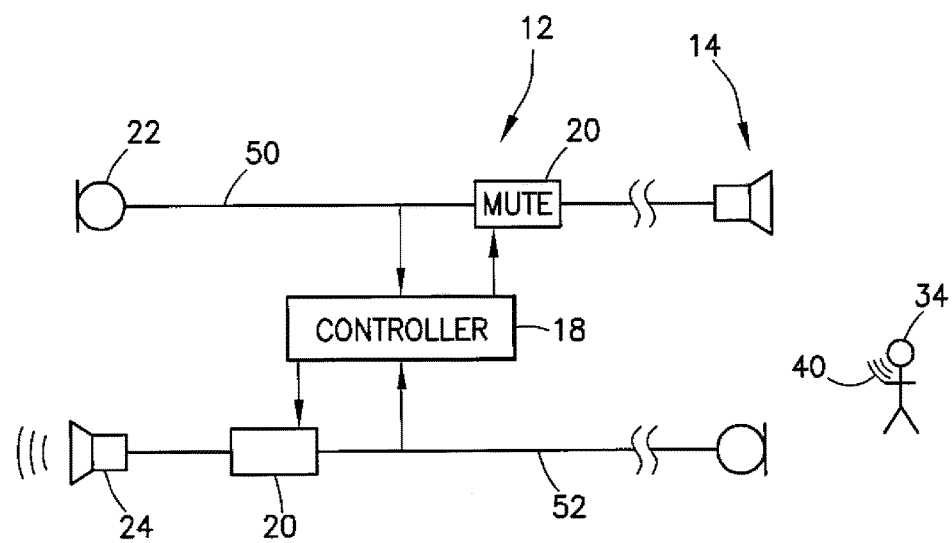

In FIGS. 5-8 the operation of some features can be seen in different talk conditions. FIG. 5 shows a situation where there is only one-way talk; the first user 32 is talking 42. Filter 20a is basically a pass through in the path 50 in this situation, and filter 20b may be used as a mute in the path 52. FIG. 6 shows a situation where there is only one-way talk, but in the opposite direction; the second user 34 is talking 40. Filter 20b is basically a pass through in the path 52 in this situation, and filter 20a may be used as a mute in the path 50. The controller 18 is able to sense signals in the paths 50, 52 and control the filters 20 accordingly. Thus, if there is only one-way talk as shown in FIGS. 5 and 6 then the other channel is muted.

Figure 7:
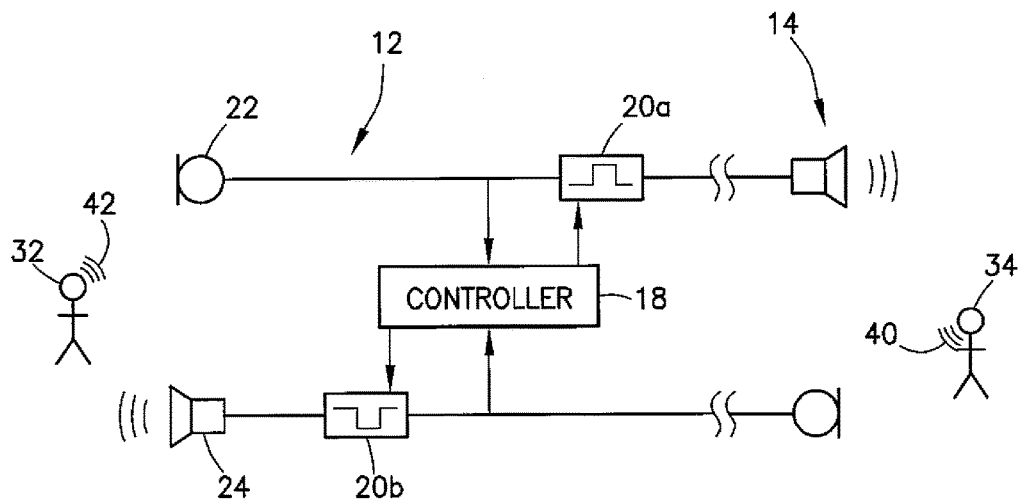
Figure 8:
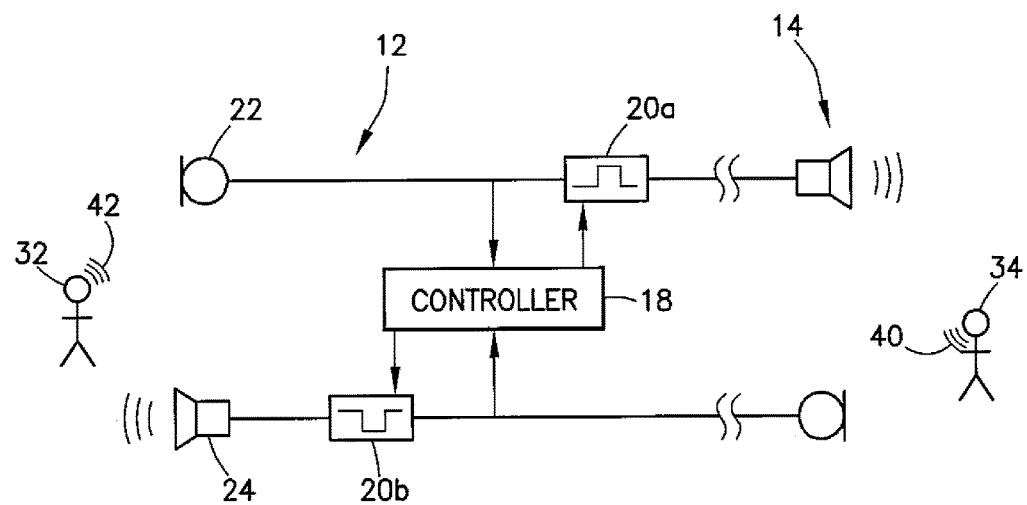

FIG. 7 shows a situation where there is two-way talk (a double talk situation); the second user 34 was talking 40 as in FIG. 6 and the first user interrupted by talking 42. In this situation filter 20a becomes a band-pass filter in the path 50, and filter 20b becomes a band-stop filter in the path 52. FIG. 8 shows a situation where there is two-way talk (a double talk situation); the first user 32 was talking 42 as in FIG. 5 and the second user 34 interrupted by talking 40. In this situation filter 20a becomes a band-stop filter in the path 50, and filter 20b becomes a band-pass filter in the path 52.

If there is talk from two directions, as shown in FIGS. 7 and 8, the more active talker signal may be filtered with a band-stop filter that removes at least one band from the signal. The sub-band(s) which is removed may be so narrow, and in such frequencies, that removing the sub-band(s) does not significantly reduce speech intelligibility or general quality. The less active talker signal may be filtered with a band-pass filter so that only that sub-band(s) is passed through. The sub-band(s) may be so narrow, and in such frequencies, that the signal is not of very high quality. However, even the small amount of audio that passes through after band-pass filtering is enough to let the other party understand that he/she is being interrupted. The band-pass and band-stop filters may be mirror images of each other. In other words, the cut-off frequencies of the band-pass and band-stop filters may be the same. In some embodiments the band-pass and band-stop filters may be replaced by low-pass and high-pass filters, respectively, where the filters have a same cut-off frequency.

Echo cancellation can perform extremely well at high frequencies such as above 2 kHz for example. Lower frequencies, such as below 1 kHz for example, seem to be problematic mainly due to distortions caused by the loudspeaker. By splitting the speech band into two or more sub-bands, or generating the bands automatically by algorithm decision, higher bands may provide full-duplex speech performance either by successful Acoustic Echo Cancelling (AEC) operation or by controlling the loudspeaker and microphone processing in sub-bands depending on the situation. When speech is not simultaneous from both sides (near-end and far-end) the lowest bands can perform the best with top quality sound. When speech activity is high in both sides of the call (during double-talk), it is possible to attenuate a problematic frequency band from the loudspeaker to let microphone signal pick-up and pass through the speech at that frequency range either from both sides of the speech link or only from the other side. If both the near end and the far end sides use this frequency splitting method, the sub-bands used in one end should not overlap the sub-band used in the other end in order to not be canceled out in the other end.

On low frequencies, there is typically plenty of speech energy, which is not needed much for preserving speech intelligibility. Speech intelligibility is preserved mostly on a mid-frequency range lying somewhere around 1 to 2 kHz. Wider frequency range increases speech naturalness and makes it also easier for the listener to recognize the person who is speaking at the other end. However, in extremely harsh double-talk situations, when a microphone(s) is close to a loudspeaker and people are relatively far away from microphone(s), there is no means to carry out decent full-band echo cancellation. Thus, in extremely harsh double-talk situations, it would be beneficial to filter out troublesome high power frequencies and focus on mid-range, such as from 1000 Hz to 2000 Hz for example, where speech intelligibility is best preserved and full-duplex operation better maintained with only a cost in reduced naturalness during double talk period.

Features as described herein may provide a control method for detecting a harsh double-talk situation, and narrowing down the frequency range for reducing signal throughput to guarantee speech intelligibility is based on residual echo measures. If there is too much residual echo in the return channel, bandwidth will be reduced. Control can be a hard decision to switch from full frequency range to selected sub-band(s) and wise versa such as based on an amount of residual echo. Optionally, control may be adjusted based on the residual echo content with gradual change from wider to narrow frequency range. A Farrow structure may, be utilized to adjust frequency range of the band-pass filter.

In order to optimize algorithm performance, it is possible to use a Dante Ethernet link for passing some vital audio parameters as metadata between the active speaker/microphone unit on the stage to the producer's personal computer, or other audio device that the system (such as NOKIA OZO) is using for speech communication. In standard telecommunication systems there is restricted possibilities, if any, to pass metadata in a speech channel. In this case, however, one can fully benefit from Dante audio networking capabilities to pass any metadata needed as there is no standard or other regulatory requirements restricting this. Dante (Digital Audio Network Through Ethernet) is a combination of software, hardware, and network protocols that deliver uncompressed, multi-channel, low-latency digital audio over a standard Ethernet network using Layer 3 IP packets.

Optionally, speech information that is lost in a near-end side, such as due to great acoustic coupling, may be somewhat emphasized in a far-end by reproducing substitutive content. This brings up naturalness lost in transmission by artificially fill-up missing speech content in the receiving end.

Figure 9:
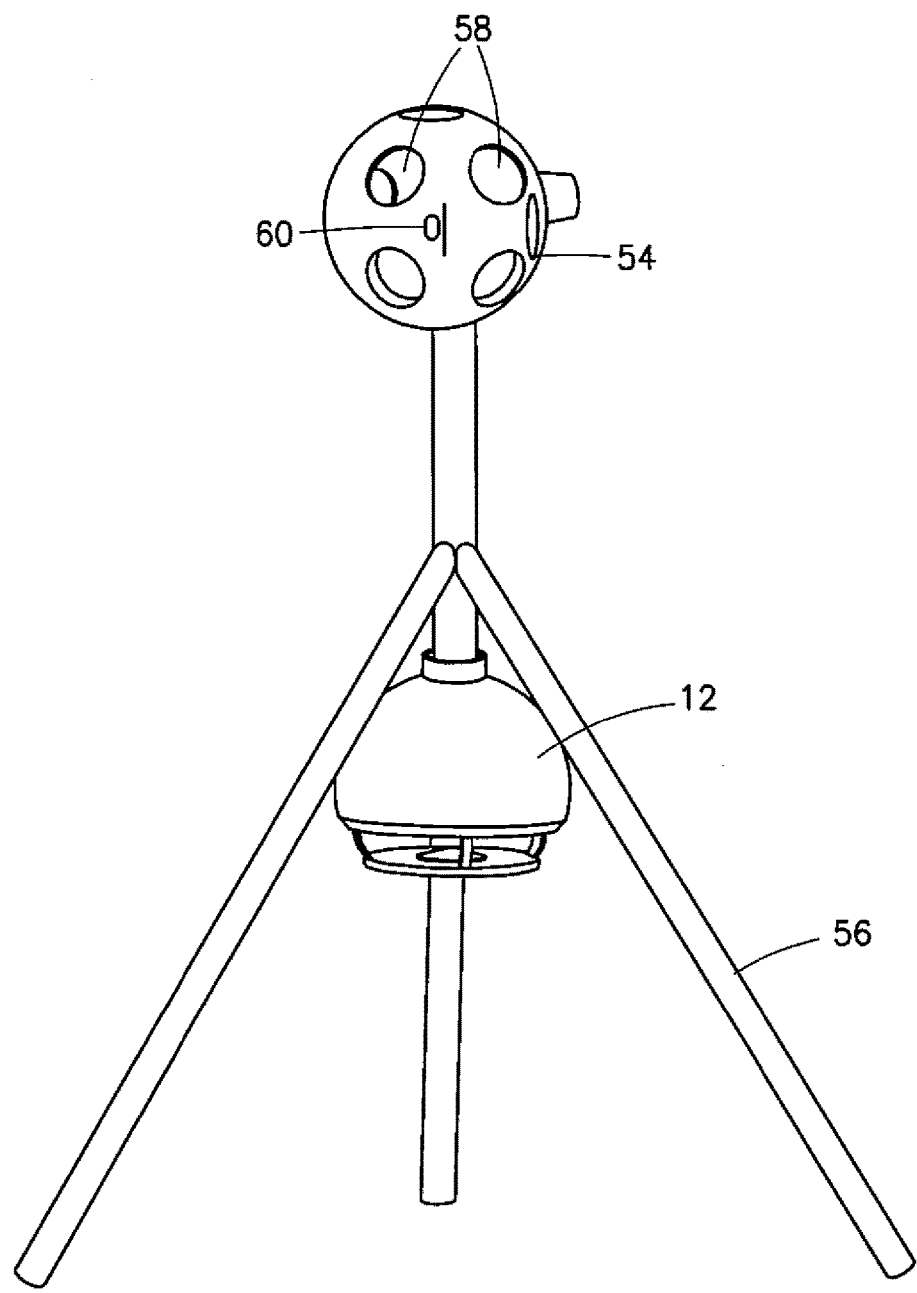
FIG. 9 is a diagram illustrating an example embodiment of the apparatus in an assembly with other components.
Figure 10:
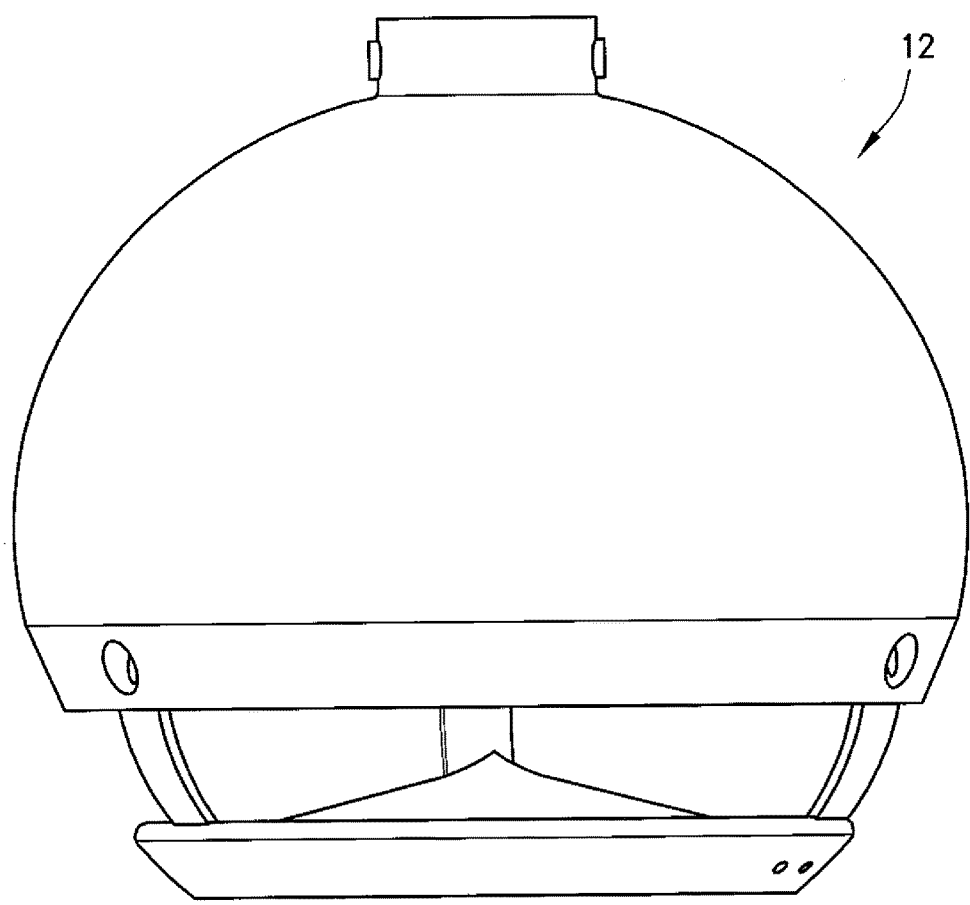
FIG. 10 is a side view of the apparatus shown in FIG. 9.
Figure 11:
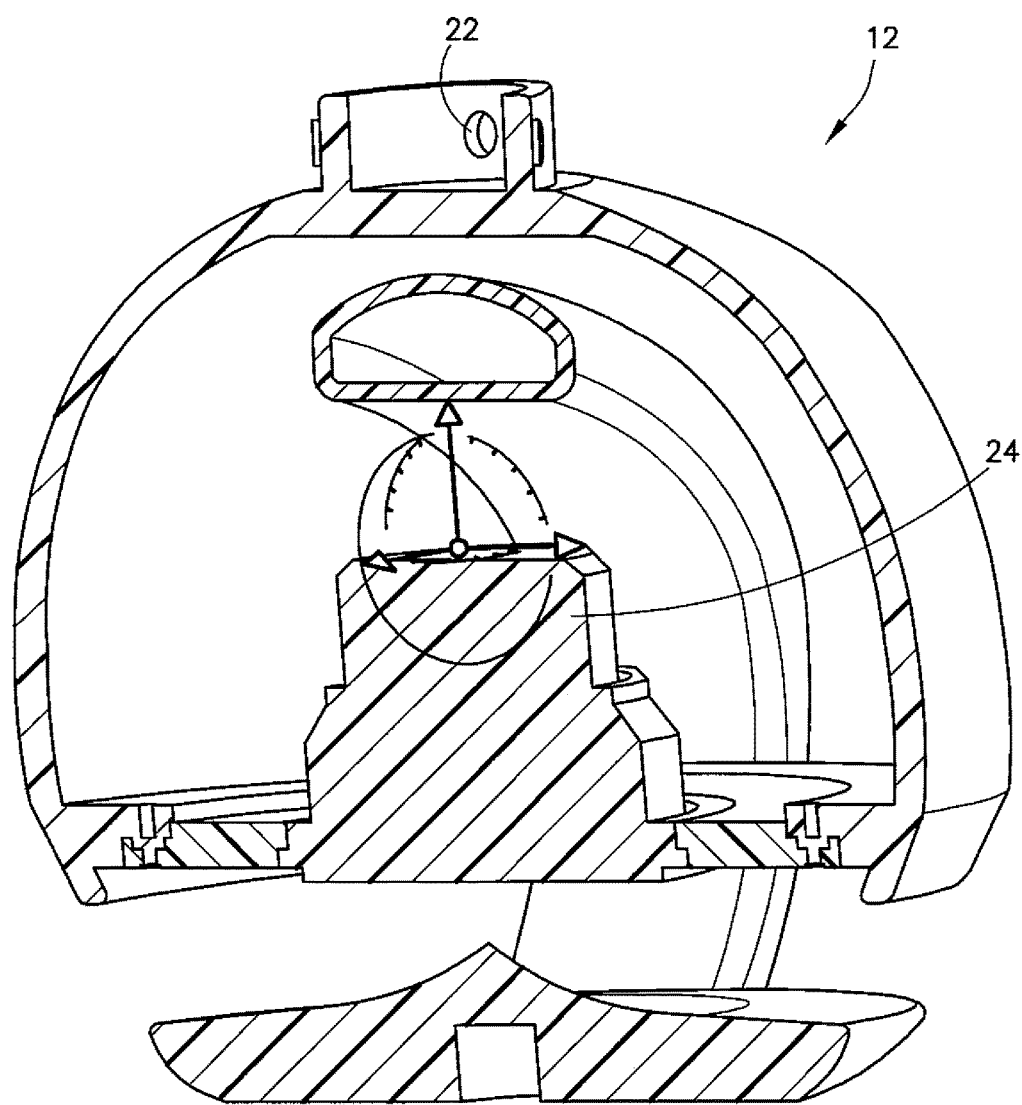
FIG. 11 is a cross sectional view of the apparatus shown in FIG. 10.
Figure 12:
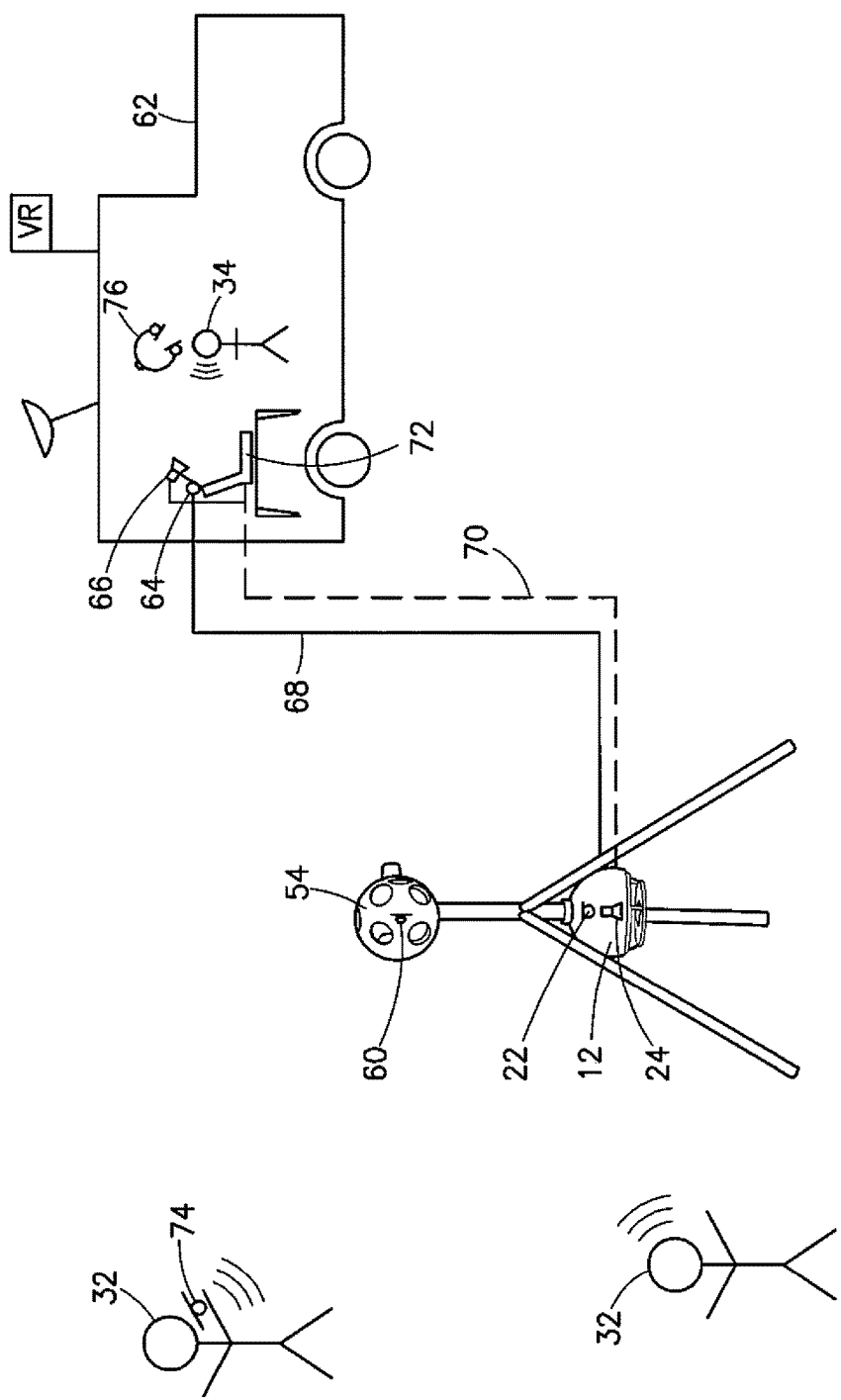
FIG. 12 is a diagram illustrating use of the apparatus shown in FIG. 9 at a recording location and shown connected to a remote production location vehicle.

Referring also to FIG. 9, an example of the apparatus 12 is shown with a VR imaging device 54 as an assembly on a tripod 56. In this example the VR imaging device 54 has eight image sensors 58 with 195 degree field of view per lens to enable it to capture 360 degree×360 degree recordings. The VR imaging device 54 also has eight microphones to record 360×360 surround sound. Referring also to FIGS. 10-11 the apparatus 12 has at least one microphone and at least one speaker. Referring also to FIG. 12, the assembly is shown located at a recording location with the first users 32, and the second user 34 is located in a VR recording vehicle 62. The apparatus 12 is connected to a microphone 64 and speaker 66 in the vehicle 62 by links 68. Metadata 70 may also be transmitted between the computer 72 and the apparatus 12. Lavalier microphone 74 may be present at the recording location as well. The different microphones 22, 60, 74 may have different latencies and require unique processing for echo cancellation. The second user 34 may also have a headset 76 with a microphone and earpiece.

Regarding the device 12 as shown in FIGS. 9-12, rather than providing the device 12 as an extra attachment for the VR imaging device 54, at least some of the functionality of the device 12 may be achieved by adding a loudspeaker 24 to the VR imaging device 54 and using the microphones 60 already in the VR imaging device 54. Alternatively, the loudspeaker 24 may be in a separate device (similar to 12 shown in FIGS. 9-12 for example located with the VR imaging device 54) and may use the microphones 60 already in the VR imaging device 54. The microphones and loudspeaker(s) may also all be separate devices controlled by a separate control device.

The features of the apparatus 12, such as for a separate VR producer speech channel in a production environment for example, may be provided entirely separately from the VR imaging device 54, or provided entirely integrated with the VR imaging device 54, or partially separate and partially integrated with the VR imaging device 54. Thus, if provided entirely separately from the VR imaging device 54, or provided partially separate and partially integrated with the VR imaging device 54, the apparatus 12 (or at least part of the apparatus 12) may be sold as an add-on for the VR imaging device 54.

Whether the loudspeaker and microphones are placed in the VR imaging device 54 or provided as a separate unit does not make much difference from the audio processing point of view. However, there may be some integration issues to be considered. Device 12 as a standalone solution can be used with third party cameras. Remote communication can be set up between any two (or more) locations within a network with no excessive costs. So, both configurations are possible; functionality integrated within the VR imaging device 54 would be seamless to the end user, but a separate audio device may be used in situations when there comes need to setup an ad-hoc speech communication between remote locations especially without simultaneously feeding VR video content.

Processing of the far-end signals as well as near end signals may be provided. Features as described herein may use a matched complementary filter pair. Whenever there is strong echo detected on any frequency (calculated from signal power of the received far-end signal), features as described herein may switch to a filtering mode passing only the frequencies on a selected sub-band, such as 1000-4000 Hz for example, through the loudspeaker 24 creating an acoustical feedback only on the 1000-4000 Hz frequencies. Meanwhile, processing of the transmit signal may filter out the far-end content on the selected sub-band 1000-4000 Hz. Hence, with features as described herein, the processed transmit signal may now contains only near-end signal on frequencies below 1000 Hz and above 4000 Hz, and nothing in between 1000-4000 Hz. This way both directions may be kept "alive" at the same time, but only on restricted frequency ranges. Features as described herein may also be used for controlling the processing by masking and weighting, and this would work even in the case if the matched filter pair was operated simply by ON/OFF switch that is based on signal power calculation of the received far-end signal.

With features as described herein, a sound channel may be defined as a frequency range dedicated to each loudspeaker. With at least two loudspeakers, one may split the frequency range accordingly, such as 1000-2000 Hz for the first loudspeaker L1 and 2000-4000 Hz for the second loudspeaker L2. More specifically, different sound sources may be played in each loudspeaker, such as a first person P1 talking through L1 and a second person P2 talking through L2. A processing block for the loudspeaker path is also provided. Also, removing acoustical echo from the loudspeaker to the microphone is not the same as removing electrical network echo. Features as described herein do not use high-pass filters solely to remove an unnecessary low-frequency part of the signals to avoid distortion of sound in transducers. Features as described herein do not merely utilize band splitting. Full-band audio is also not attempted to pass through by applying echo cancellation (adaptive filtering) on each sub-band. Instead, sub-bands are adaptively split and used based upon audio feedback to improve acoustic echo cancellation. The far-end signal may also be completely separated from the near-end signal based on non-overlapping frequency bands.

Features as described herein may be used to improve acoustic echo cancellation and provide virtually full duplex speech in a system of active loudspeakers and microphones. The system may consist of loudspeakers and microphones connected to each other forming an audio network for speech communication in Virtual Reality (VR) production.

Features as described herein may be used to solve problems with acoustic coupling in an apparatus where at least one active loudspeaker and one or more microphones are integrated in a device that is located in at least one end of a Virtual Reality producer's speech channel. At VR reality production scenes, a remotely located producer needs a speech channel to communicate with scene actors and staff on stage. For the stage people, in order to listen to the producer and to be able to talk back to him, it would be necessary to use a device with (at least one) loudspeaker and (at least one) microphone placed nearby a VR recording device such as NOKIA's OZO (or a similar product) for example. The NOKIA OZO VR recording system is able to record in 360 degrees for example. Due to the great degree of acoustic coupling between the loudspeaker and the microphone(s) which might occur, a solution for echo cancellation may be provided. A conventional solution is to mute uplink (microphone) speech signal in order to prevent echo looping back to far-end. Therefore, if someone is talking to the uplink microphone, his or her voice is muted too, and duplex communication is lost. Personal mobile phones with or without integrated hands-free (IHF phones) can be used for communication between a VR producer and stage people of a VR recording area. However, mobile telephony is restricted by international standards that rule operation in double-talk situation. If Private Mobile Radio (PMR) devices were used, they are constrained to half-duplex operation by their nature. PMR devices either have PTT (push-to-talk buttons) or they obey VOX (Voice Operated X-mitter) meaning that there is only one person speaking (device transmitting) at a time while other persons on the same radio channel can only listen (devices receiving).

Features as described herein may be used to provide an acoustic echo control method that is primarily related to a single device located in one end of a dedicated speech communication channel. The device contains at least one loudspeaker and at least one microphone. Features as described herein are not restricted to a single device, and may be used with multiple loudspeakers and microphones even located separately; not in just one device unit. However, in case of multiple loudspeakers and microphones, they may be connected to the same audio network and, there may be a common controller or audio processor that controls the audio streaming to and from stage also when a plurality of transducers (i.e. microphones and loudspeakers) is being used.

Different from a convention device, features as described herein may utilize a specific frequency sub-band for stage people to get their voice through the system in order to interrupt the producer in double talk situations. On this device specific frequency sub-band a conventional acoustic echo cancellation may work reasonably well or, if not, then the loudspeaker signal may be muted on that device specific sub-band in order to make it possible to pass through the stage people voice and make it possible for the producer to hear that someone wants to interrupt him/her. The duplex operation is, therefore, virtual as there is speech content only on a specific sub-band during a double-talk situation. Unlike with commercial telephony applications, in this case, there is no need to try to reach a high quality full band audio experience meeting the requirements in telephony standards and, thus, during double-talk. It is sufficient to pass only audio in a limited frequency band in order to make it possible to interrupt the other end. When double-talk is not detected, the full audio band may be utilized in one direction.

Figure 13:
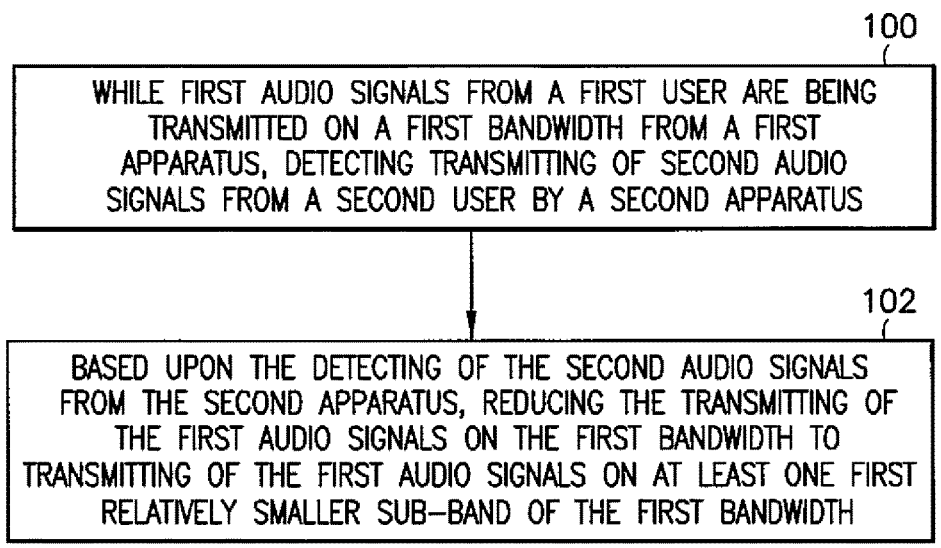
FIG. 13 is a diagram illustrating an example method.

Referring also to FIG. 13, an example method may comprise, while first audio signals from a first user are being transmitted on a first bandwidth from a first apparatus, detecting transmitting of second audio signals from a second user by a second apparatus as indicated by block 100; and based upon the detecting of the second audio signals from the second apparatus, reducing the transmitting of the first audio signals on the first bandwidth to transmitting of the first audio signals on at least one first relatively smaller sub-band of the first, bandwidth as indicated by block 102.

The first apparatus may be, or may comprise, a first audio transducer. The second apparatus may be, or may comprise, a second audio transducer. The transmitting of second audio signals may be on at least one second different sub-band of the first bandwidth. The method may further comprise using a band-pass filter on the second audio signals from the second apparatus to limit the second audio signals to the at least one second different sub-band. The reducing may comprise use of a band-stop filter, and the band-pass filter and the band-stop filter may be substantially mirror images of each other. The reducing may comprise splitting the first bandwidth into the at least one first relatively smaller sub-band and at least one second different sub-band of the first bandwidth. The method may further comprise detecting when the transmitting of second audio signals from the second apparatus stops, and increasing the transmitting of the first audio signals to the first bandwidth. The method may further comprise detecting when the transmitting of first audio signals from the first apparatus stops, and increasing the transmitting of the second audio signals to the first bandwidth. The reducing may comprise use of a band-stop filter. The method may further comprise varying a bandwidth of the at least one sub-band based upon the transmitting of second audio signals from the second apparatus.

An example apparatus may comprise at least one processor; and at least one non-transitory memory including computer program code, the at least one memory and the computer program code configured to, with the at least one processor, cause the apparatus to: while first audio signals from a first user are being transmitted on a first bandwidth from the apparatus, detect transmitting of second audio signals from a second user by a second apparatus; and based upon the detecting of the second audio signals from the second apparatus, reduce the transmitting of the first audio signals on the first bandwidth to transmitting of the first audio signals on at least one first smaller sub-band of the first bandwidth.

The transmitting of second audio signals may be on at least one second different sub-band of the first bandwidth. The at least one memory and the computer program code further configured to, with the at least one processor, may cause the apparatus to use a band-pass filter on the second audio signals from the second apparatus to limit the second audio signals to the at least one second different sub-band. The apparatus may comprise a band-stop filter, and where the band-pass filter and the band-stop filter are substantially mirror images of each other. The at least one memory and the computer program code may be further configured to, with the at least one processor, cause the apparatus to split the first bandwidth into the at least one first relatively smaller sub-band and at least one second different sub-band of the first bandwidth. The at least one memory and the computer program code may be further configured to, with the at least one processor, cause the apparatus to detect when the transmitting of second audio signals from the second apparatus stops, and increase the transmitting of the first audio signals to the first bandwidth. The at least one memory and the computer program code may be further configured to, with the at least one processor, cause the apparatus to detect when the transmitting of first audio signals from the first apparatus stops, and increase the transmitting of the second audio signals to the first bandwidth. The apparatus may comprise a band-stop filter. The at least one memory and the computer program code may be further configured to, with the at least one processor, cause the apparatus to vary a bandwidth of the at least one sub-band based upon the transmitting of second audio signals from the second apparatus. The first apparatus and the second apparatus may be connected to a network (such as having a communication channel that could be cellular or non-cellular for example) in order to transmit, detect transmitting, etc. It is understood that these two apparatus somehow communicate via a network, such as via a speech call for example. The first apparatus and the second apparatus may be configured to communicate with each other, but such communication signals may be provided via respective audio transducers by means of controlling the driving of the audio transducers whilst trying to determine whether or not there is single way transmitting (single talk condition) or multi-way transmitting (double talk condition).

A predetermined bandwidth (or an adaptive approach deciding which sub-band should be used) may be used with the communication network where the signal content is also determined, such as speech signals in a double talk condition for example. When there is no double talk condition, then the full bandwidth of the communication network may be used for communicating. Because there may be different situations (i.e. single talk, double talk, etc.), sound producing transducers (such as at a stage-end and/or at a producerend for example) may be driven by means of filtering or simply muting depending on the detected situation.

An example apparatus may comprise means for detecting transmitting of second audio signals from a second user by a second apparatus while first audio signals from a first user are being transmitted on a first bandwidth from a first apparatus; and means for reducing the transmitting of the first audio signals on the first bandwidth to transmitting of the first audio signals on at least one first relatively smaller sub-band of the first bandwidth based upon the detecting of the second audio signals from the second apparatus.

An example embodiment may be provided in a non-transitory program storage device, such as 28 for example, readable by a machine, tangibly embodying a program of instructions executable by the machine for performing operations, the operations comprising: while first audio signals from a first user are being transmitted on a first bandwidth from a first apparatus, detecting transmitting of second audio signals from a second user by a second apparatus; and based upon the detecting of the second audio signals from the second apparatus, reducing the transmitting of the first audio signals on the first bandwidth to transmitting of the first audio signals on at least one smaller sub-band of the first bandwidth.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   while first audio signals are being transmitted on a first bandwidth from a first apparatus, detecting transmitting of second audio signals from a second apparatus, where the detecting comprises a sensor of the first apparatus sensing the second audio signals sent to a transducer of the first apparatus; and
   based upon the detecting, with the sensor, of the second audio signals sent to the transducer of the first apparatus, the first apparatus reducing the transmitting of the first audio signals from the first bandwidth to transmitting of the first audio signals, from the first apparatus to the second apparatus, on at least one first relatively smaller sub-band of the first bandwidth.

2. A method as in claim 1 where the transmitting of second audio signals is on at least one second different sub-band of the first bandwidth.

3. A method as in claim 2 further comprising using a band-pass filter on the second audio signals from the second apparatus to limit the second audio signals to the at least one second different sub-band.

4. A method as in claim 3 where the reducing comprises use of a band-stop filter, and where the band-pass filter and the band-stop filter are substantially mirror images of each other.

5. A method as in claim 1 where the reducing comprises splitting the first bandwidth into the at least one first relatively smaller sub-band and at least one second different sub-band of the first bandwidth.

6. A method as in claim 1 further comprising detecting when the transmitting of second audio signals from the second apparatus stops, and increasing the transmitting of the first audio signals to the first bandwidth.

7. A method as in claim 1 further comprising detecting when the transmitting of first audio signals from the first apparatus stops, and increasing the transmitting of the second audio signals to the first bandwidth.

8. A method as in claim 1 where the reducing comprises use of a band-stop filter.

9. A method as in claim 1 further comprising varying a bandwidth of the at least one relatively smaller sub-band based upon the transmitting of second audio signals from the second apparatus.

10. A method as in claim 1 further comprising limiting the second apparatus from transmitting the second audio signals on the at least one first relatively smaller sub-band of the first bandwidth.

11. A method as in claim 10 where the second audio signals are in the first bandwidth and are a matched complement in the first bandwidth to the at least one first relatively smaller sub-band of the first bandwidth.

12. An apparatus comprising:
    at least one processor; and
    at least one non-transitory memory including computer program code, the at least one memory and the computer program code configured to, with the at least one processor, cause the apparatus to:
    while first audio signals are being transmitted on a first bandwidth from the apparatus, detect transmitting of second audio signals from a second apparatus, where the detecting comprises a sensor of the first apparatus sensing the second audio signals sent to a transducer of the first apparatus; and
    based upon the detecting with the sensor of the second audio signals sent to the transducer of the first apparatus, reduce the apparatus transmitting of the first audio signals from the first bandwidth to transmitting of the first audio signals, from the apparatus to the second apparatus, on at least one first smaller sub-band of the first bandwidth.

13. An apparatus as in claim 12 where the transmitting of second audio signals is on at least one second different sub-band of the first bandwidth.

14. An apparatus as in claim 13 where the at least one memory and the computer program code are further configured to, with the at least one processor, cause the apparatus to use a band-pass filter on the second audio signals from the second apparatus to limit the second audio signals to the at least one second different sub-band.

15. An apparatus as in claim 14 where the apparatus comprises a band-stop filter, and where the band-pass filter and the band-stop filter are substantially mirror images of each other.

16. An apparatus as in claim 12 where the at least one memory and the computer program code are further configured to, with the at least one processor, cause the apparatus to split the first bandwidth into the at least one first relatively smaller sub-band and at least one second different sub-band of the first bandwidth.

17. An apparatus as in claim 12 where the at least one memory and the computer program code are further configured to, with the at least one processor, cause the apparatus to detect when the transmitting of second audio signals from the second apparatus stops, and increase the transmitting of the first audio signals to the first bandwidth.

18. An apparatus as in claim 12 where the at least one memory and the computer program code are further configured to, with the at least one processor, cause the apparatus to detect when the transmitting of first audio signals from the first apparatus stops, and increase the transmitting of the second audio signals to the first bandwidth.

19. An apparatus as in claim 12 where the apparatus comprises a band-stop filter.

20. An apparatus as in claim 12 where the at least one memory and the computer program code are further configured to, with the at least one processor, cause the apparatus to vary a bandwidth of the at least one relatively smaller sub-band based upon the transmitting of second audio signals from the second apparatus.

21. A non-transitory program storage device readable by a machine, tangibly embodying a program of instructions executable by the machine for performing operations, the operations comprising:
while first audio signals are being transmitted on a first bandwidth from a first apparatus, detecting transmitting of second audio signals from a second apparatus, where the detecting comprises a sensor of the first apparatus sensing the second audio signals sent to a transducer of the first apparatus; and
based upon the detecting with the sensor of the second audio signals sent to the transducer of the first apparatus, the first apparatus reducing the transmitting of the first audio signals from the first bandwidth to transmitting of the first audio signals, from the first apparatus to the second apparatus, on at least one smaller sub-band of the first bandwidth.

22. A method comprising:
while first audio signals are being transmitted on a first bandwidth from a first apparatus, a control of the first apparatus receiving an indication of transmitting of second audio signals from a second apparatus; and
based upon the receipt of the indication by the control, the first apparatus reducing the transmitting of the first audio signals from the first bandwidth to transmitting of the first audio signals, from the first apparatus to the second apparatus, on at least one first relatively smaller sub-band of the first bandwidth.

23. A method as in claim 22 where the reducing of the transmitting of the first audio signals comprises a first switching from the transmitting of the first audio signals on the first bandwidth to the transmitting of the first audio signals on the at least one first relatively smaller sub-band of the first bandwidth, and the method further comprises a second switching by the first apparatus from the transmitting of the first audio signals on the at least one first relatively smaller sub-band of the first bandwidth back to transmitting of the first audio signals on the first bandwidth when the control stops receiving the indication of the transmitting of second audio signals from a second apparatus.

24. A method as in claim 22 where the at least one first relatively smaller sub-band of the first bandwidth is a matched complement to a second bandwidth of the second audio signals transmitted from a second apparatus, where the second bandwidth is at least one second relatively smaller sub-band of the first bandwidth.

25. A method as in claim 22 where the second audio signals from the second apparatus are on at least one second relatively smaller sub-band of the first bandwidth.

26. A method as in claim 25 where the at least one first relatively smaller sub-band of the first bandwidth is a matched complement to the at least one second relatively smaller sub-band of the first bandwidth.

27. A method as in claim 22 where the reducing of the transmitting of the first audio signals from the first bandwidth to transmitting of the first audio signals to at least one first relatively smaller sub-band of the first bandwidth comprises use of a bandstop filter.

28. A method as in claim 27 where the method further comprises filtering the second audio signals from the second apparatus with a second filter which is substantially inverse to the bandstop filter.

29. An apparatus comprising:
at least one processor; and
at least one non-transitory memory including computer program code, the at least one memory and the computer program code configured to, with the at least one processor, cause the apparatus to:
while first audio signals are being transmitted on a first bandwidth from the apparatus, a control of the apparatus determining receipt of an indication of transmitting of second audio signals from a second apparatus; and
based upon the receipt of the indication by the control, the apparatus reducing the transmitting of the first audio signals from the first bandwidth to transmitting of the first audio signals, from the apparatus to the second apparatus, on at least one first relatively smaller sub-band of the first bandwidth.

30. A non-transitory program storage device readable by a machine, tangibly embodying a program of instructions executable by the machine for performing operations, the operations comprising:
while first audio signals are being transmitted on a first bandwidth from a first apparatus, a control of the first apparatus determining receipt of an indication of transmitting of second audio signals from a second apparatus; and
based upon the receipt of the indication by the control, causing the first apparatus to reduce the transmitting of the first audio signals from the first bandwidth to transmitting of the first audio signals, from the first apparatus to the second apparatus, on at least one first relatively smaller sub-band of the first bandwidth.

* * * * *